US008202403B2

(12) United States Patent
Sideropoulos et al.

(10) Patent No.: US 8,202,403 B2
(45) Date of Patent: Jun. 19, 2012

(54) CORE DE-ENTRAINMENT DEVICE FOR VESSELS WITH TANGENTIAL INLETS

(75) Inventors: Theodore Sideropoulos, Oakton, VA (US); Arun K. Sharma, Missouri City, TX (US)

(73) Assignee: ExxonMobil Research & Engineering Company, Annandale, NJ (US)

( * ) Notice: Subject to any disclaimer, the term of this patent is extended or adjusted under 35 U.S.C. 154(b) by 909 days.

(21) Appl. No.: 12/071,217

(22) Filed: Feb. 19, 2008

(65) Prior Publication Data

US 2008/0314729 A1   Dec. 25, 2008

Related U.S. Application Data

(60) Provisional application No. 60/902,879, filed on Feb. 23, 2007.

(51) Int. Cl.
- *B01D 3/06* (2006.01)
- *B01D 3/10* (2006.01)
- *B01D 3/32* (2006.01)
- *B01D 45/16* (2006.01)

(52) U.S. Cl. ........... 203/40; 55/438; 95/269; 96/196; 96/214; 202/158; 202/182; 202/197; 202/205; 203/88; 203/91; 208/41; 208/361; 208/366; 261/79.1; 261/113

(58) Field of Classification Search ............. 95/269; 96/196, 214; 196/114; 202/158, 182, 197, 202/205; 203/40, 88, 91; 208/41, 361, 366; 261/79.1, 113; 55/438, 462
See application file for complete search history.

(56) References Cited

U.S. PATENT DOCUMENTS

| 3,200,568 | A | * | 8/1965 | McNeil | 96/195 |
| 3,501,400 | A | * | 3/1970 | Brody | 208/361 |
| 4,105,723 | A | * | 8/1978 | Mix | 261/105 |
| 4,270,975 | A | * | 6/1981 | Bennett | 159/27.2 |
| 4,315,815 | A |   | 2/1982 | Gearhart | |
| 4,770,747 | A |   | 9/1988 | Muller | |
| 5,314,529 | A | * | 5/1994 | Tilton et al. | 96/204 |
| 5,972,171 | A | * | 10/1999 | Ross et al. | 203/40 |

(Continued)

FOREIGN PATENT DOCUMENTS

WO    WO 97/28893    8/1997

(Continued)

OTHER PUBLICATIONS

PCT International Search Report.

*Primary Examiner* — Virginia Manoharan
(74) *Attorney, Agent, or Firm* — Malcom D. Keen; Glenn T. Barrett (57) ABSTRACT

A distillation tower for use in a petrochemical or petroleum operation effects liquid and vapor separation by using centrifugal force applied to the feed introduced into a ring from a tangential inlet. The feed is separated into a liquid component that flows into the bottoms section of the tower and a vapor component that flows upwardly through the core of the ring to a wash zone in the tower. De-entrainment devices are provided in the core so that the vapor swirling upwardly impacts the devices and any remaining entrained liquid is separated from the vapor. As a result, overflash with decreased resid can be collected from the wash zone and used as feed suitable for a fluid catalytic cracking operation, for example.

20 Claims, 4 Drawing Sheets

U.S. PATENT DOCUMENTS

| | | | |
|---|---|---|---|
| 6,682,633 B1 * | 1/2004 | Xu et al. | 203/1 |
| 7,104,529 B2 * | 9/2006 | Laird et al. | 261/79.2 |
| 2004/0130041 A1 * | 7/2004 | Resetarits et al. | 261/79.2 |
| 2005/0029686 A1 | 2/2005 | Laird et al. | |
| 2005/0261530 A1 * | 11/2005 | Stell et al. | 585/648 |
| 2008/0053869 A1 * | 3/2008 | McCoy et al. | 208/42 |

FOREIGN PATENT DOCUMENTS

| | | |
|---|---|---|
| WO | WO 97/30780 | 8/1997 |
| WO | WO 2005/049167 | 6/2005 |

* cited by examiner

CORE DE-ENTRAINMENT DEVICE FOR VESSELS WITH TANGENTIAL INLETS

CROSS REFERENCE TO RELATED APPLICATIONS

This application relates to and claims priority to U.S. Provisional Patent Application No. 60/902,879, entitled "Core De-Entrainment Devices for Vessels with Tangential Inlets," filed on Feb. 23, 2007.

BACKGROUND OF THE INVENTION

1. Field of the Invention

This invention relates to devices for separating vapor and liquid. In particular, the invention relates to separating vapor and entrained liquid in a hydrocarbon distillation tower in which a feedstream is introduced into a flash zone.

2. Discussion of Related Art

Separation units, such as atmospheric distillation units, vacuum distillation units and product strippers, are major processing units in a refinery. Atmospheric or vacuum distillation units separate crude oil into fractions according to boiling point so downstream processing units, such as hydrogen treating or reforming units, will have feedstocks that meet particular specifications. Crude oil separation is accomplished by fractionating the total crude oil at essentially atmospheric pressure and then feeding a bottoms stream of high boiling hydrocarbons, also known as topped crude, from the atmospheric distillation unit to a second distillation unit operating at a vacuum pressure.

The vacuum distillation unit typically separates the atmospheric unit bottoms into gas oil vapors based on boiling point, including light gas oil, heavy gas oil, vacuum gas oil, and vacuum reduced crude. The vacuum reduced crude is also known as residuum or "resid" and leaves the vacuum distillation unit as a liquid bottoms stream.

In atmospheric or vacuum distillation, lighter hydrocarbons are vaporized and separated from relatively heavier hydrocarbons so that they can be fed downstream for catalytic processing. The bottoms separated from crude oil by an atmospheric distillation unit are fed to a flash zone in the lower portion of the vacuum distillation unit. Although the heavier hydrocarbons do not vaporize, they may be carried into the lighter hydrocarbons due to entrainment. The entrained heavier hydrocarbons are typically contaminated with metals, such as vanadium or nickel, which can poison the downstream catalytic processing, such as hydrotreating, hydrocracking, or fluid catalytic cracking.

If the entrainment of the heavier components can be significantly reduced or eliminated, a significant improvement in the quality of the feed for hydroconversion units, catalytic cracking units, and vacuum towers producing valuable gas oil distillates or lube oil distillates can be realized, in both yield and quantity.

Various methods of reducing entrainment of residuum from the flash zone have been developed. Many distillation towers use inlet horns for introducing the feedstream to the flash zone. One type of inlet horn uses a tangential entry for the vapor-liquid feed that opens into a peripheral open bottomed horn. The horn can be an annular or arcuate channel defined by an outer peripheral wall and an internal arcuate wall spaced from the tower peripheral wall and having a closed top. Thus, the feedstream swirls through the horn and the liquid and vapor components impact the walls from centrifugal force and separate since the force on the more dense liquid is substantially greater than the centrifugal force acting on the vapor. The separated liquid flows downward due to gravity to the stripping zone for collection in the bottom portion of the tower. The vapor component also flows downwardly within the horn and then out of the horn toward the lower pressure flash zone and is swept upwardly through the core toward the wash zone of the tower.

One example of a peripheral horn is shown in U.S. Pat. No. 4,770,747 in which the inlet horn has angularly disposed vanes connected between the walls of the channel so that vapor-liquid separation takes place evenly along the arc length of the horn.

Another example of an inlet horn is shown in U.S. Pat. No. 4,315,815 in which corrugated vanes are disposed in the horn for utilizing the centrifugal motion to create turbulence in the stream in the inlet horn. In this case, the turbulence causes a portion of the fine particle size bituminous material to impinge on the surfaces of the inlet horn and recombine with the fluid so that vaporized solvent and steam can be withdrawn.

The problem with the prior art devices is that the inlet horns still allow an amount of vapor with entrained liquid to move up the tower through the core of the horn. In a typical tower, the overflash, which includes vacuum gas oils in the wash oil, is collected from the overflash collection tray and sent to the stripping zone for further processing. It typically has a high percentage of resid and is not suitable for certain feed applications, especially for fluid catalytic cracking (FCC). In order to more effectively use the overflash, especially for FCC feed, it is desirable to further reduce the entrainment of resid. Additionally, more effective de-entrainment will improve the reliability of the wash zone. Excessive resid entrainment in the wash zone accelerates formation of coke, forcing sub optimal operation and shutdown. Higher quality overflash, such as would be acceptable for FCC, can increase wash oil rates and virtually eliminate the risk of coking, allowing units to operate at higher temperatures and higher efficiencies.

Thus, there is a need for a separation device in which entrainment of resid can be significantly reduced.

BRIEF SUMMARY OF THE INVENTION

Aspects of embodiments of the invention relate to providing a de-entrainment device that effectively separates entrained liquid from vapor.

Another aspect of embodiments of the invention relates to a separation assembly that provides a low cost method of reducing entrainment to provide overflash that can be upgraded for additional uses, such as FCC feed.

This invention is directed to a liquid-vapor separation assembly for use in a distillation tower comprising a tower having a peripheral wall with at least one tangential inlet therein and a central hollow core. An interior wall is spaced from the peripheral wall and is connected thereto by a top wall so that a channel with a closed top and an open bottom is defined between the peripheral wall and interior wall. A vapor flow path extends from the inlet, through the channel, under the interior wall and up into the core. At least one de-entrainment device extends from the interior wall into the core of the tower to form an obstruction in the vapor flow in the core.

The interior wall can be arcuate or annular. A pair of tangential inlets can be formed in the peripheral wall.

The de-entrainment device can be a barrier or a partition. The barrier or partition can be a wall, solid or porous, disposed vertically or at a non-vertical angle, and can have channels to direct separated liquid away from the vapor flow. The de-entrainment device can be formed as a crinkled mesh screen or could have elongated V-shaped channels. The de-entrainment device can include a plurality of evenly spaced partitions extending inwardly in the core from the interior wall, and the partitions can be disposed at different vertical levels.

The invention is also directed to a distillation tower comprising an outer shell with at least one inlet, wherein a flash zone is disposed in a lower portion of the shell and a wash zone is disposed in an upper portion of the shell and a fluid flow path extends from the inlet through the flash zone and into the wash zone. An annular ring is disposed within the shell in communication with the inlet and adjacent to the flash zone. The annular ring is formed as an open bottom channel and defines a hollow central core leading to the wash zone. At least one de-entrainment device is disposed within the core, wherein the de-entrainment device is a barrier in the flow path, so that a mixed phase feed flowing from the inlet through the channel separates into a liquid that flows downward toward the flash zone and a vapor that flows upward through the core and impinges on the de-entrainment device to effect separation of liquid remaining entrained in the flowing vapor.

The inlet can be tangential and can comprise a pair of opposed tangential inlets.

The de-entrainment device can be a partition extending from the annular ring into the core. The partition can include V-shaped or other shaped channels, a crinkled wire mesh screen, a plurality of barrier walls spaced around the annular ring at different vertical heights, or a plurality of barrier walls each disposed at a non-vertical angle.

The distillation tower can be combined with a refinery operation.

The invention is also directed to a method of separating liquid entrained in vapor in a fluid stream in a distillation tower comprising introducing a feed stream into a distillation tower at a flash zone through a tangential inlet, directing the feed stream into an annular ring formed of an open bottom channel so that some liquid separates from vapor in the fluid stream, wherein the separated liquid flows downwardly into the tower and the vapor flows upwardly through a core of the annular ring, and impeding the vapor flow through the core of the annular ring to cause entrained liquid to separate from the upwardly flowing vapor.

Impeding the vapor flow may include providing barriers in the core of the annular ring, providing angled partitions protruding from a wall of the annular ring into the core, or providing crinkled wire mesh screens protruding from a wall of the annular ring into the core.

These and other aspects of the invention will become apparent when taken in conjunction with the detailed description and appended drawings.

BRIEF DESCRIPTION OF THE DRAWINGS

The invention will now be described in conjunction with the accompanying drawings in which.

In the drawings, like reference numerals indicate corresponding parts in the different figures.

DETAILED DESCRIPTION OF PREFERRED EMBODIMENTS

The de-entrainment device disclosed herein can be used in various systems that relate to separation devices, particularly devices for separating vapor streams that have entrained liquid droplets. While the device is described in the context of a processing unit in a refinery, especially with respect to crude oil processing, liquid entrainment reduces separation efficiency in other hydrocarbon and non-hydrocarbon systems in which feed entries are flashed. Typical systems include product strippers or towers that are fed a partially vaporized stream. It will be understood that this device can be used in various settings.

Figure 11:
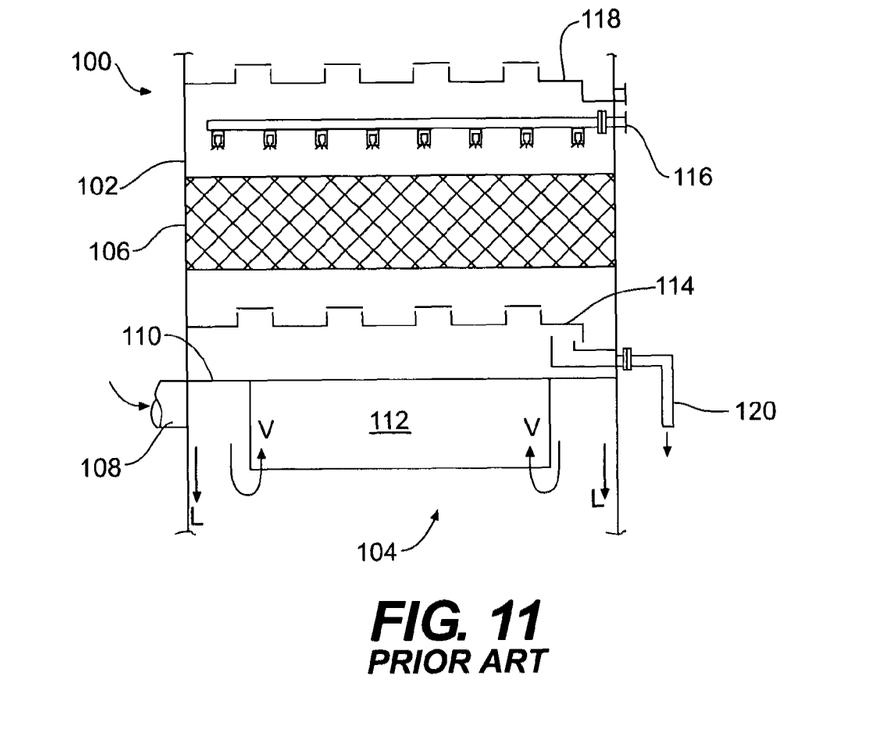
FIG. 11 is a schematic side view in section of a conventional inlet area of a distillation tower.
Figure 12:
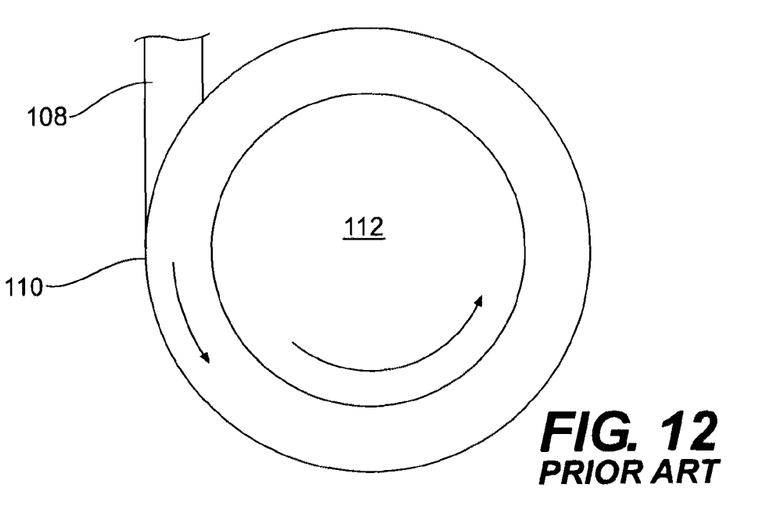
FIG. 12 is a plan view of the inlet area of FIG. 11.

The components representative of a conventional distillation tower 100 are schematically shown in FIG. 11. The tower 100 is formed of a shell 102 made of a peripheral wall. FIG. 11 shows two zones within the tower 100 including the flash zone 104 and the wash zone 106. The flash zone 104 has a tangential inlet 108 that leads to an annular ring 110. As seen in FIG. 12, the annular ring 110 defines a central hollow core 112.

Mixed phase feed, which is formed of vapor and liquid and is typically heated, enters the tower 100 through the inlet 108. The feed experiences centrifugal action in the annular ring 110, as illustrated by the arrow in FIG. 12, which separates much of the liquid from the vapor. The separated liquid L then moves down the tower 100 by gravity and is collected and treated in the bottom, or stripping section, of the tower 100.

The vapor V plus entrained liquid, called resid, moves up the tower 100 through the core 112 of the annular ring 110 to the upper wash zone 106 for rectification and collection of the distilled separated products. Specifically, the vapor travels through the overflash collection tray 114, also called a chimney tray, and into the wash zone 106. The wash zone 106 is filled with packing and is designed to remove entrainment. The captured entrainment is washed down by injecting wash oil from an injection device 116 at the top of the wash zone 106. The wash oil is typically vacuum gas oil. Part of the wash oil is vaporized, and rises upward in the tower 100 to another collector tray 1118, if desired. The remainder wash oil, including the captured entrainment, drop into the overflash collection tray 114 and are removed via the overflash outlet 120. The remainder stream is called the overflash. It may contain 30%-50% resid. While a significant portion of the overflash is gas oil, the resid content, including metals and carbon, is too high to be used as feed for most FCC units. The overflash is typically sent to the stripping section of the tower 100 along with the liquid portion from the feed.

Figure 1:
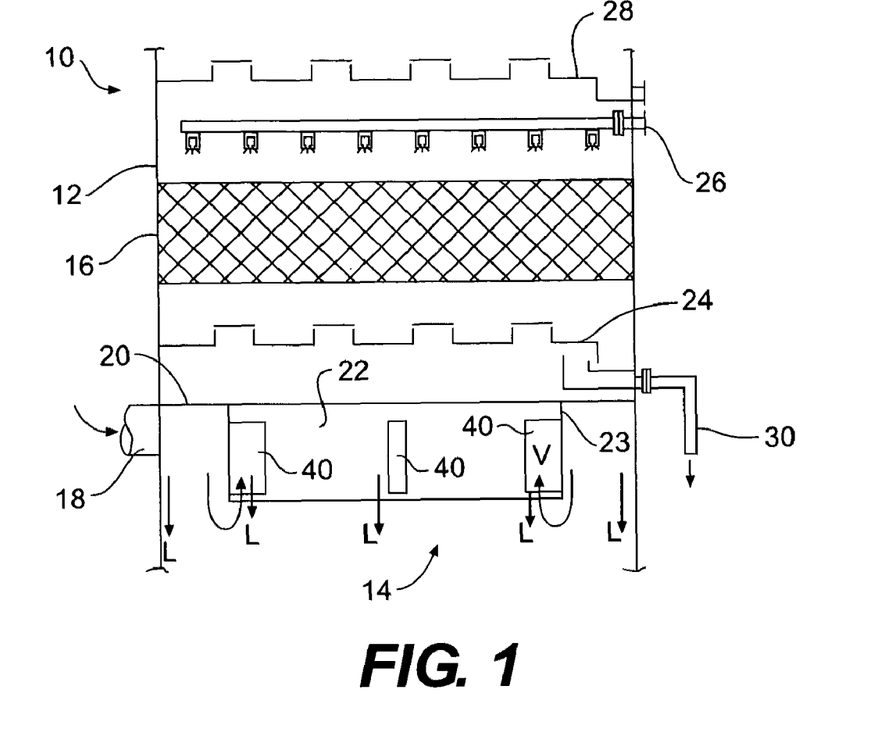
FIG. 1 is a schematic side view in section of a distillation tower in accordance with the invention.
Figure 2:
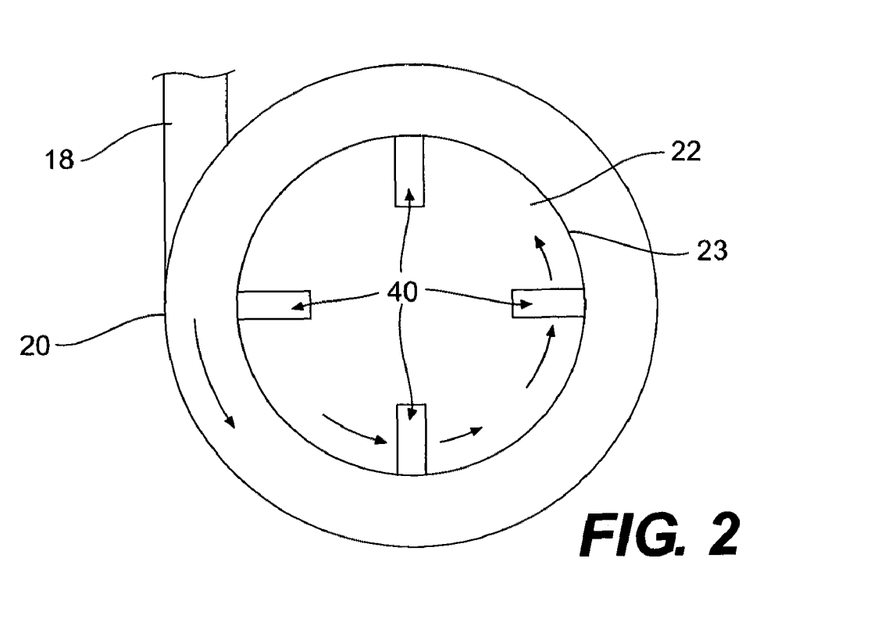
FIG. 2 is a plan view of the inlet area of the distillation tower showing the inlet and annular ring of FIG. 1.
Figure 3:
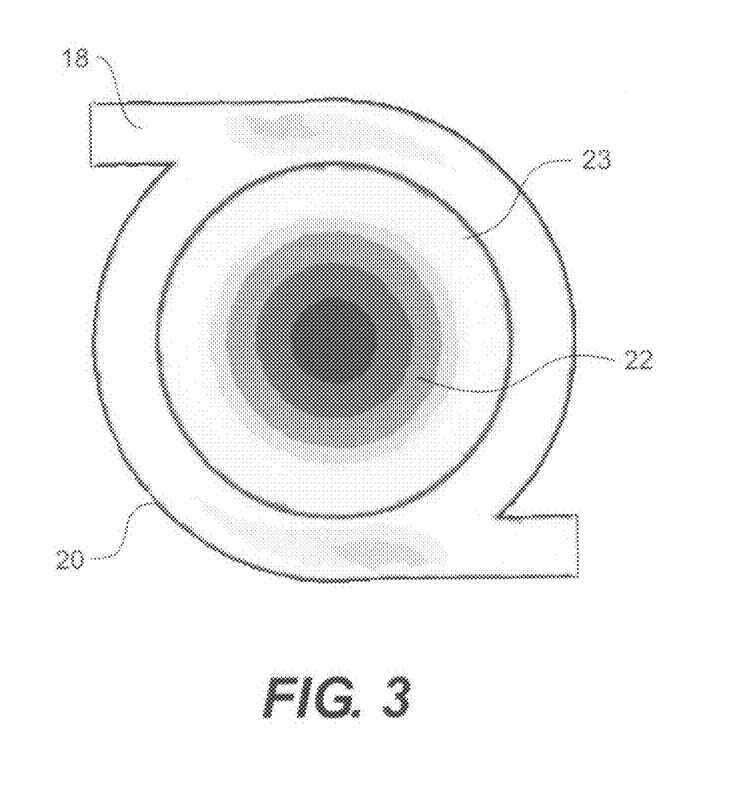
FIG. 3 is a plan view of an inlet area showing a velocity profile of an inlet and annular ring.

The distillation tower 10 in accordance with this invention has similar basic components, as seen in FIG. 1. The tower 10 is formed of a shell 12 which has an inner peripheral arcuate wall. Two zones are shown within the tower 10 including the flash zone 14 and the wash zone 16. The flash zone 14 has a tangential inlet 18 that leads to an annular ring 20. The annular ring 20 is formed as on open bottom channel with side walls and top wall. As seen in FIG. 2, the annular ring 20 defines a central hollow core 22 with an interior wall 23. While the ring 20 is shown as entirely annular it is also possible to use segments of the arcuate wall. Additionally, it is also possible to use more than one inlet 18; for example, a pair of opposed tangential inlets can also be utilized, as shown in FIG. 3 (one inlet designated 18).

As explained above, mixed phase feed, formed of vapor and liquid, enters the tower 10 through the inlet 18 and becomes separated under the centrifugal action in the annular ring 20. The separated liquid L then moves down the tower 10 by gravity and is treated in the bottom, or stripping section, of the tower 10.

The vapor V plus any entrained resid moves up the tower 10 through the core 22 of the annular ring 20. The vapor travels through the overflash collection tray 24, also called a chimney tray, and into the wash zone 16 for entrainment removal. The captured entrainment is washed down by injecting wash oil from an injection device 26 at the top of the wash zone 16. The wash oil is typically vacuum gas oil. Part of the wash oil is vaporized, and rises upward in the tower 10 to another collector tray 28, if desired. The remainder wash oil, including the captured entrainment, or overflash is dropped into the overflash collection tray 24 and is removed via the overflash outlet 30. The overflash is typically sent to the stripping section of the tower 10 along with the liquid portion from the feed.

As seen in FIGS. 1 and 2, in this distillation tower 10, additional de-entrainment devices are used to reduce or eliminate resid entrainment in the vapor before it reaches the wash zone. Specifically, at least one de-entrainment device 40 is disposed within the core 22 of the annular ring 20. As seen in FIG. 2, in a preferred embodiment, a plurality of de-entrainment devices 40 are spaced within the core 22. The de-entrainment devices 40 are disposed to take advantage of the areas within the core that experience the highest velocities in the rising vapor.

FIG. 3 shows a map of a velocity profile taken at the inlet nozzle elevation projected at the X-Y (horizontal) plane of the ring 20. The highest velocities occur in the channel of the annular ring 20 near the inlet (in this case, near both inlets). Within the core 22, the highest velocities occur at the interior core wall 23 and diminish toward the center of the core 22. This is the effect of the centrifugal forces of the spinning vapor within the channel of the ring 20 and the vapor that flows under the interior wall 23 into the core 22. The de-entrainment devices 40 take advantage of the very high velocities near the wall 23 to de-entrain droplets of resid that could not be removed by centrifugal action alone. The devices 40 can be arranged in various configurations within the core 22, as described below. While the devices 40 could extend entirely across the diameter of the core 22, it is not necessary as the velocity of the vapor at the center of the core 22 is greatly diminished. The devices 40 are effective when extending outwardly a defined distance from the wall 23 so as to act as barriers to the upwardly swirling vapor. For example, the devices 40 can extend outward from the wall 23 about 2 to 4 feet into the core 22.

Figure 4:
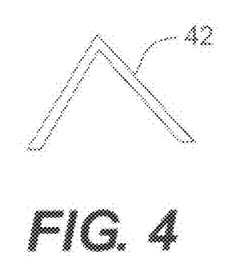
FIG. 4 is a top view of a de-entrainment device in accordance with the invention.
Figure 5:
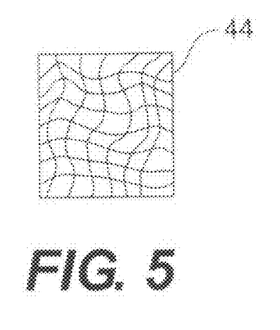
FIG. 5 is a front view of another de-entrainment device in accordance with the invention.
Figure 6:
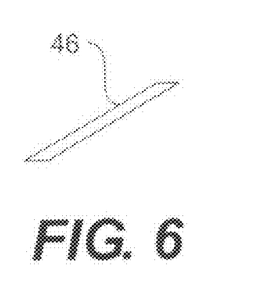
FIG. 6 is a side view of another de-entrainment device in accordance with the invention.

The devices 40 can be formed as any type of barrier or partition that captures the liquid entrained with the rising vapor and channels the liquid from the core to prevent re-entrainment with the swirling vapor. In the most simple form, the barrier or partition can be a wall with downwardly extending channels. As seen in FIG. 4, the channels 42 may be shaped as elongated chevrons or V-shaped elements. The devices could also be formed of crinkled wire mesh screens 44, as seen in FIG. 5. FIG. 6 shows the barrier formed as a wall 46 disposed at an angle to vertical. The number, dimensions, elevation, angle, and impact on velocity profile can vary depending on application. For example, the devices 40 can be evenly spaced around the core 22. The devices 40 could also be disposed in a vertically staggered or offset arrangement.

Figure 7:
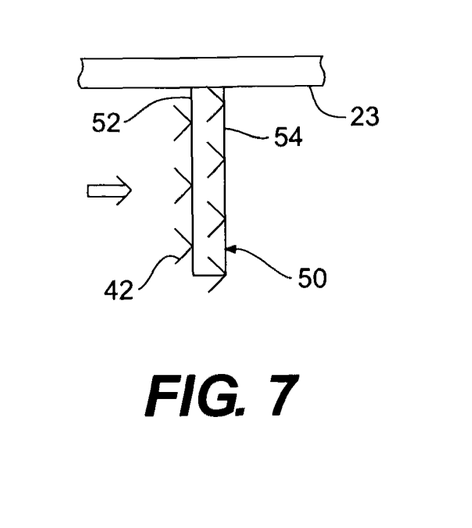
FIG. 7 is a top view of a de-entrainment device installed in the core.

FIG. 7 shows one embodiment of the de-entrainment devices 40 in which a partition 50 extends outwardly from the interior wall 23 of the core 22 and has V-shaped channels 42 disposed in a staggered fashion across the partition 50. In this case, the partition 50 is made such that vapor can flow through portions of the partition 50. For example, the partition 50 may be made of screen or of an open framework or merely horizontal supports. The partition 50 has a front 52 and a back 54 offset from the front so that the channels 42 can extend across the full width of the partition 50 while still allowing the vapor represented by the arrow to flow through the partition 50. As can be understood by FIG. 7, the vapor flowing through and past the partition 50 will impinge on the channels 42, which will cause liquid to separate and flow downwardly toward the bottom of the core 22. By this, the separated liquid will not become re-entrained with the swirling vapor.

Figure 8:
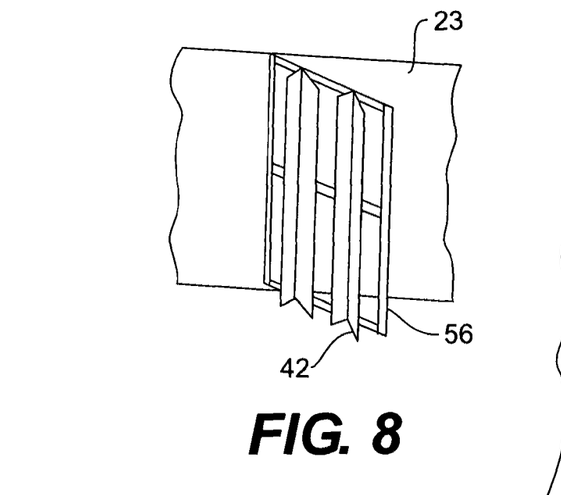
FIG. 8 is a side perspective view of a de-entrainment device installed in the core.

FIG. 8 shows a side view of partition 56 formed as an open framework with the channels 42 supported thereon. As can be understood, any suitable supporting device can be used to support the channels in a desired configuration. In this case, a single wall is provided but multiple staggered walls, similar to those shown in FIG. 7, could also be provided.

Figure 9:
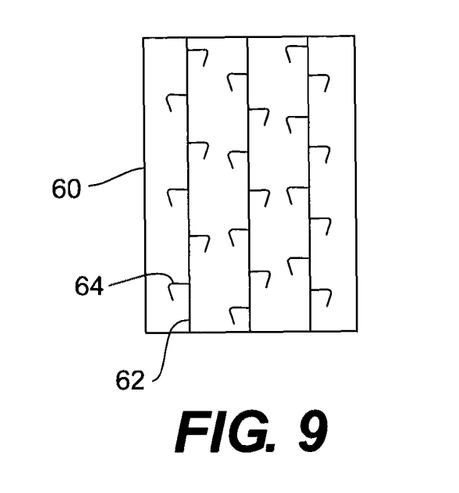
FIG. 9 is a front view of a modified de-entrainment device.

FIG. 9 shows another configuration in which a partition 60, which again could be a screen, mesh or other permeable wall, has a series of vertically oriented channels 62 with flanges 64 disposed along their length to catch liquid and direct it to the channels as the vapor swirls around and upwardly through the core 22. The channels 62 could be grooves or simply elongated elements that would naturally direct liquid flow downward due to gravity. The flanges 64 could be cap elements upon which the vapor impinges and the liquid separates and clings to before naturally flowing downwardly due to gravitational forces. By catching and directing the separated liquid downwardly, re-entrainment can be diminished.

Figure 10:
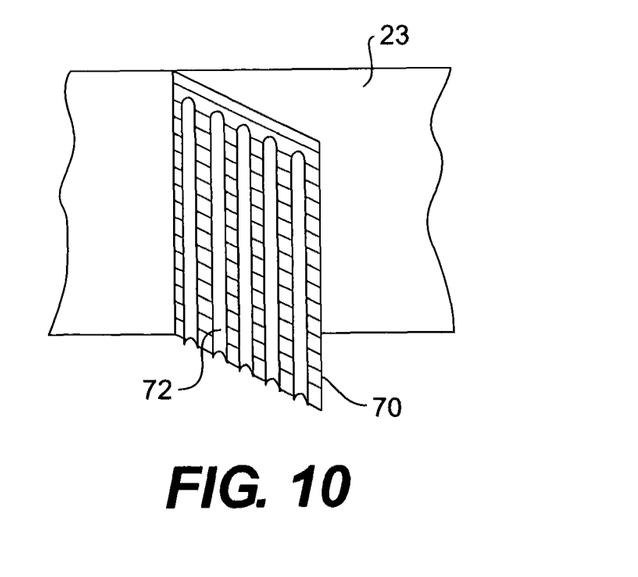
FIG. 10 is a side perspective view of another de-entrainment device installed in the core.

FIG. 10 illustrates another modification of a partition in which a screen wall 70 has a series of elongated curved drainage elements 72 supported thereon. The drainage elements 72 can be half-pipes supported on the screen wall 70 or could be grooves cut into another type of supporting wall.

These embodiments are intended to illustrate the various forms the drainage channels can take along with the various types of support partitions suitable for use in the core. With any of these configurations, multiple offset layers of channels, as seen in FIG. 7, could be used. Additionally, the channels could be vertically offset as well. The channels can extend to the lower edge of the interior core wall 23 or could extend below the core wall 23 to ensure that the liquid is directed to a point beneath the upwardly flowing vapor to prevent re-entrainment. It is even possible to provide drainage formations in the interior core wall 23 in communication with the de-entrainment devices 40 in order to direct liquid away from the swirling vapor.

The assembly can be configured based on the particular desired application. Factors that will impact the design parameters include the type, quantity, and desired distillation rate of the feed to be distilled. Other factors include the vapor-liquid feed ratio, the vapor and liquid density, and the flash zone pressure.

Various changes to the design details can be made and remain within the scope of the invention. The design dimensions, which may vary, include the radius of the tower, the radius of the channel, the height of the channel, the angle between the de-entrainment devices, the number of devices, and particular configuration of the devices.

The liquid-vapor separation assembly can be used for distillations conducted at superatmospheric, atmospheric, and subatmospheric pressures. It is applicable to the distillation of feeds such as petroleum crude oils, natural gas condensate, residua, heavy oils, and the like. The assembly may also be used for the distillation of feeds other than petroleum and petroleum refining derived liquids and liquid-vapor mixtures. For example, suitable feeds include mixtures of organic and inorganic solvents, organic oxygenates and mixtures thereof, and mixtures of distillable natural products.

The vapor will have both horizontal and vertical velocity components. The de-entrainment devices can be chosen and designed to handle both components. For example, to improve drainage, the de-entrainment devices and/or the drainage channels may be placed at a non-vertical angle. The devices also may have integral gutters or other drainage configurations.

If the de-entrainment devices become coked or plugged, the distillation tower function will not be affected. Since the remaining open area of the core is sufficient for the passage of vapor, operation of the tower will not be adversely affected. In particular, even if the de-entrainment devices become coked or plugged, the distillation tower will not need to be shut down. Additionally, there will be virtually no pressure drop if the de-entrainment devices become plugged.

Another benefit of the assembly disclosed herein is that the swirl velocity of the vapor will be reduced, which will improve the vapor distribution of the packed bed above the flash zone. Also, it is desirable to reduce the velocity as high vapor velocities can re-entrain the collected liquid.

Various modifications can be made in our invention as described herein, and many different embodiments of the device and method can be made while remaining within the spirit and scope of the invention as defined in the claims without departing from such spirit and scope. It is intended that all matter contained in the accompanying specification shall be interpreted as illustrative only and not in a limiting sense.

What is claimed is:

1. A distillation tower having a liquid-vapor separation assembly and comprising:
   (i) an outer shell defining an inner peripheral arcuate wall around a central hollow core;
   (ii) at least one tangential feed inlet;
   (iii) a channel leading from the at least one tangential feed inlet and having a closed top and an open bottom defined by the inner peripheral arcuate wall and an interior wall spaced from the inner peripheral wall and connected thereto by a top wall to form the channel to impart a spinning motion to the vapor within the channel and the vapor that flows in a vapor flow path extending from the inlet, through the channel, under the interior wall and up into the hollow central core; and
   (iv) a plurality of vapor permeable barriers extending into the vapor flow path in the central hollow core of the tower to form an obstruction in the spinning vapor in the vapor flow path in the central hollow core.

2. The distillation tower of claim 1, wherein the channel forms a ring.

3. The distillation tower of claim 1 which includes a pair of opposed tangential feed inlets.

4. The distillation tower of claim 1, wherein the barriers each include elongated drainage channels to direct liquid separated from the vapor flow out of the core.

5. The distillation tower of claim 1, wherein the barriers have at least one V-shaped drainage channel.

6. The distillation tower of claim 1, wherein a plurality of drainage channels are disposed on the barriers at staggered distances from the interior wall.

7. The distillation tower of claim 1, wherein the barriers are disposed at a non-vertical angle.

8. The distillation tower of claim 1, wherein the barriers are vertically oriented.

9. The distillation tower of claim 1, wherein the barriers each comprise a crinkled mesh screen.

10. The distillation tower of claim 1, wherein the barriers are evenly spaced and extending inwardly in the core from the interior wall.

11. The distillation tower of claim 10, wherein the barriers are disposed at different vertical levels.

12. A distillation tower according to claim 1, which is a vacuum distillation tower in which:
   the outer shell has a flash zone disposed in a lower portion of the outer shell and a wash zone is disposed in an upper portion of the outer shell, with a fluid flow path which extends from the at least one feed inlet through the flash zone and into the wash zone;
   the channel with the closed top and open bottom defined by the inner peripheral arcuate wall, the interior wall and top wall being is disposed within the outer shell in communication with the at least one tangential feed inlet and adjacent to the flash zone around the hollow central core; and in which the plurality of vapor-permeable barriers extend inwardly from the interior wall of the channel into the vapor flow path in the hollow central core of the tower to form an obstruction to the spinning vapor in the vapor flow path in the core, the barriers being evenly spaced in the vapor flow path in the hollow central core, so that a mixed phase feed flowing from the at least one tangential feed inlet through the channel separates into a liquid that flows downward toward the flash zone and a vapor that flows upward through the hollow central core and impinges on the barriers to effect separation of liquid remaining entrained in the flowing vapor.

13. The distillation tower of claim 12, wherein each barrier has at least one drainage channel.

14. The distillation tower of claim 13, wherein the drainage channel is an elongated V-shaped channel.

15. The distillation tower of claim 13, wherein a plurality of drainage channels are disposed on each barrier in a staggered relationship within the core.

16. The distillation tower of claim 12, wherein each barrier comprises a crinkled wire mesh screen.

17. The distillation tower of claim 12, wherein each-barrier is disposed at a non-vertical angle.

18. A method of separating liquid entrained in vapor in a fluid stream in a vacuum distillation tower, comprising:
   introducing a feed stream into a distillation tower at a flash zone through at least one tangential feed inlet;
   directing the feed stream from the inlet into an open bottom channel surrounding a hollow central core of the tower and comprising an interior wall spaced from and connected to a peripheral arcuate wall of the tower by a top wall so that liquid separates from vapor in the fluid stream, wherein the separated liquid flows downwardly into the tower and the vapor flows upwardly through the hollow central core of the tower to a wash zone above the open bottom channel and impeding the vapor flow through the hollow central core of the tower by means of vapor permeable barriers which extend from the interior wall of the channel into the vapor flow path in the core of the tower to cause entrained liquid to separate from the upwardly flowing vapor.

19. The method of claim 18, wherein the barriers comprise crinkled wire mesh screens protruding from a wall of the channel into the core.

20. The method of claim 19, wherein the barriers have drainage channels disposed thereon.

* * * * *